N. B. DIXON.
SIDING PLOW OR CULTIVATOR.
APPLICATION FILED OCT. 7, 1910.
988,865.
Patented Apr. 4, 1911.
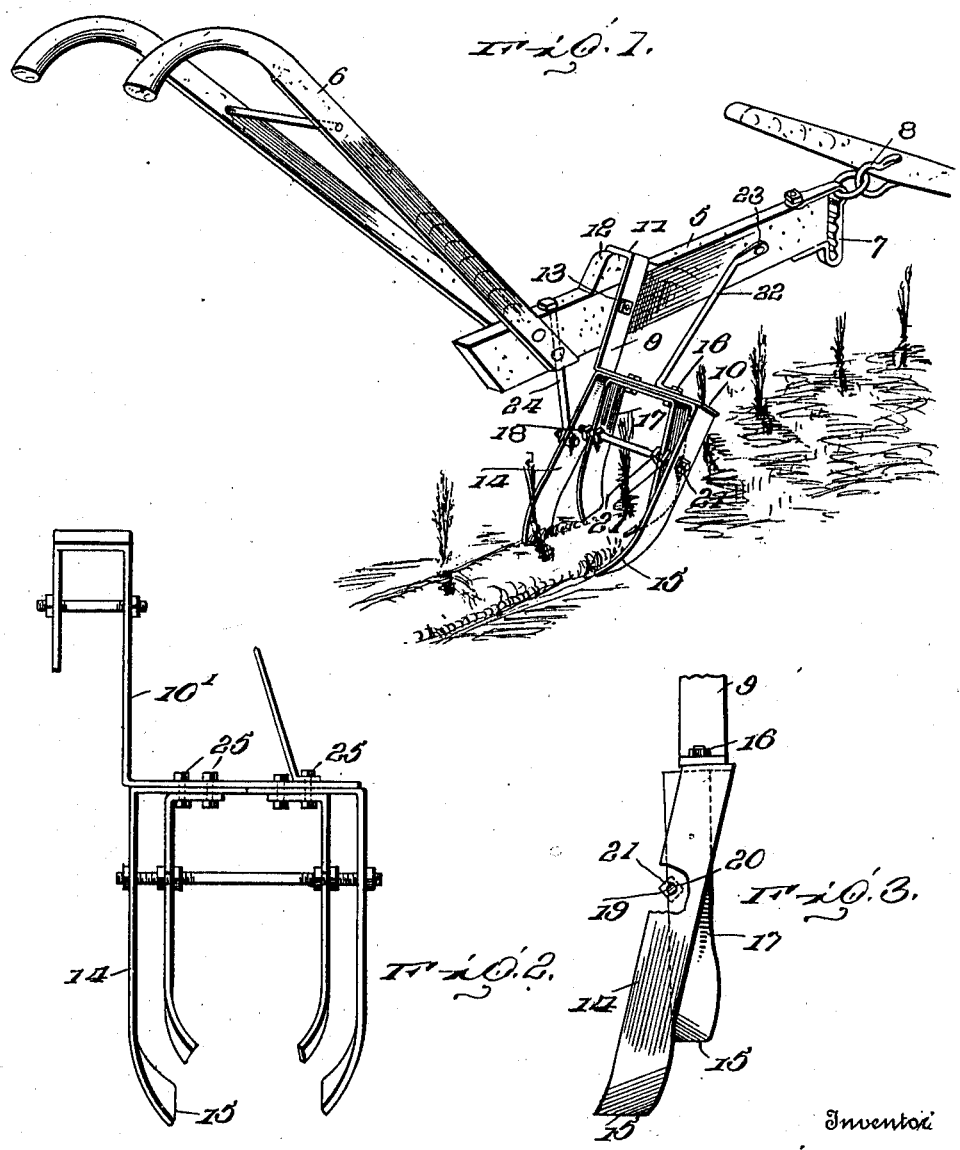

UNITED STATES PATENT OFFICE.

NAPOLEON BONAPARTE DIXON, OF DIXIE, ALABAMA.

SIDING PLOW OR CULTIVATOR.

988,865.   Specification of Letters Patent.   Patented Apr. 4, 1911.

Application filed October 7, 1910. Serial No. 585,887.

*To all whom it may concern:*

Be it known that I, NAPOLEON B. DIXON, citizen of the United States, residing at Dixie, in the county of Covington and State of Alabama, have invented certain new and useful Improvements in Siding Plows or Cultivators, of which the following is a specification.

This invention relates to siding plows or cultivators, and has for its object the provision of a strong, durable and thoroughly efficient device of this character by means of which the ground on both sides of a row of growing plants may be tilled or cultivated without danger of cutting the roots of the plants, or otherwise injuring the same.

A further object is to provide a siding plow, the blades of which are reversible, so as to throw the earth either toward or away from the plants.

A further object is to provide means for adjusting the blades laterally with respect to each other to accommodate plants of different sizes, and means for securing said blades in adjusted position.

A still further object of the invention is generally to improve this class of plows so as to increase their utility, durability and efficiency.

For a full understanding of the invention reference is to be had to the following description and accompanying drawing in which:—

Figure 1 is a perspective view of a siding plow constructed in accordance with my invention. Fig. 2 is a side elevation of the blades detached from the plow beam, a portion of one of the outer blades being broken away in order to show the tie rod. Fig. 3 is a front elevation showing the device provided with reversible blades.

Corresponding and like parts are referred to in the following description and indicated in all the views of the accompanying drawing by the same reference characters.

The improved siding plow, or cultivator, forming the subject-matter of the present invention comprises a beam 5 having handles 6 secured to one end thereof and provided at its other end with a clevis 7 for engagement with a suitable draft device indicated at 8.

Secured to the beam 5 at a point in front of the handles 6 is a bracket 9 having one end thereof provided with a laterally extending arm 10 and its other end formed with a hook 11 which bears against the inclined surface of a block 12, secured to the upper surface of the beam, as shown, said bracket being retained in position on the beam by means of a bolt or similar fastening device 13. Detachably secured to the lower face of the arm 10 is an inverted substantially U-shaped frame or yoke having depending blades 14, the lower or free ends of which are curved inwardly at 15 so as to throw the earth in the direction of the growing plants, said blades being secured to the arm by bolts or similar fastening devices 16.

Secured to the intermediate portion of the outer yoke by the bolts 16 is an inner yoke or frame having similar depending blades 17, the free ends of which are disposed slightly in advance of the forward longitudinal edges of the blades 14, and also preferably curved inwardly as best shown in Fig. 1 of the drawings.

The outer blades 14 are pierced by transversely alined openings 18 adapted to receive a threaded rod or bolt 19, there being spaced notches or recesses 20 formed in the longitudinal edges of the auxiliary blades 17 for the reception of said bolt.

Mounted for rotation on the bolt 19 are spaced clamping nuts 21 which bear against the main and auxiliary blades and by means of which said blades may be adjusted laterally with respect to each other so as to accommodate plants of different sizes. The arm 10 of the bracket together with the main and auxiliary blades are preferably inclined rearwardly so that the curved terminals 15 of the blades enter the ground on opposite sides of the growing plants and thus thoroughly cultivate the ground and at the same time throw the earth toward or around the roots of said plants without danger of cutting the roots or otherwise injuring the plants.

Secured to the outer face of the arm 10 by one of the bolts or fastening devices 16 is one end of an inclined brace 22, the opposite end of which is detachably secured to the forward end of the beam 5 as indicated at 23, said brace forming a rigid connection between the arm 10 and beam and serving to prevent accidental displacement of the supporting bracket when the cultivator is in use. It will here be noted that one of the fastening devices 16 serves the double function of securing the main and auxiliary yokes on the arm 10, and as a means for anchoring the end of the inclined brace 22.

By rotating the nuts 21 the main and auxiliary blades may be adjusted laterally with respect to each other, while by releasing said nuts and removing the fastening devices 16 the inner and outer blades may be reversed. Thus it will be seen that as the cultivator is drawn over a field or other inclosure the auxiliary blades 17 will span the growing plants and loosen the surface soil, while the blades 14 will be projected downwardly within the soil and throw the latter in the direction of the roots of the plants, so as to thoroughly cultivate the soil.

An auxiliary brace 24 is preferably secured to one of the blades 14 and to the rear end of the plow beam 5 to assist in supporting the bracket 9.

In Fig. 3 of the drawings the inner and outer yokes are preferably formed in sections so as to permit the blades of said yokes to be readily reversed, thus to throw the earth either toward or from the growing plants. When the yokes are made in sections the fixed ends thereof will preferably be secured to the supporting arm 10' by two or more bolts 25.

It will of course be understood that as many blades may be secured to the plow beam as may be found desirable or necessary and that either or both of the yokes shown in Fig. 3 of the drawings may be made in sections without departing from the spirit of the invention. It will also be understood that the terminals of the blades may be made in different sizes and shapes, but it is preferred to have the front edges of the blades at the terminals thereof curved or rounded and the rear edges of the blades square as shown.

Having thus described the invention what is claimed as new is:—

1. A plow including a beam, a bracket secured to the beam and provided with a laterally extending arm, a yoke secured to the arm and provided with spaced depending blades, an auxiliary yoke also secured to the arm and provided with similar depending blades having their longitudinal edges provided with notches, a threaded rod extending through the blades of the outer yoke and seated in said notches, and clamping nuts carried by the rod and adapted to bear against adjacent blades.

2. A plow including a beam, a bracket secured to the beam and provided with a laterally extending arm, an outer yoke secured to the arm and provided with spaced depending blades, an auxiliary yoke secured to the outer yoke and provided with similar blades, the free ends of which are disposed in advance of the front of the outer yoke, and means piercing the blades of the outer yoke and engaging the blades of the inner yoke for adjusting said blades laterally with respect to each other.

3. A plow including a beam, a bracket secured to the beam and provided with a laterally extending arm, inner and outer yokes depending from the arm and each provided with spaced depending blades, fastening devices piercing said yokes and arm, a brace forming a connection between one of the fastening devices and the forward end of the beam, and an auxiliary brace secured to one of the blades of the outer yoke and engaging the rear portion of the beam.

4. A plow including a beam, a bracket having one end thereof provided with a hooked terminal adapted to embrace the beam and its other end extended laterally to produce an arm, inner and outer yokes secured to said arm and each provided with spaced depending blades having inwardly curved terminals, the forward longitudinal edges of the inner yoke being extended through and beyond the outer yoke, and the rear longitudinal edges thereof being provided with transversely alined seating notches, a threaded rod extending through the blades of the outer yoke and engaging said seating notches, and clamping nuts mounted on the rod and adapted to bear against adjacent blades.

5. A plow including a beam, a bracket secured to and extending laterally from said beam, main and auxiliary yoke secured to the bracket and provided with depending blades, and means piercing the blades for adjusting said blades laterally toward and away from each other.

In testimony whereof I affix my signature in presence of two witnesses.

NAPOLEON BONAPARTE DIXON. [L. S.]

Witnesses:
JAMES M. MANCILL,
RANSOM D. MOORE.

---

Copies of this patent may be obtained for five cents each, by addressing the "Commissioner of Patents, Washington, D. C."